Oct. 3, 1950 J. H. HOMRIGHOUS 2,524,349

TELEVISION SYSTEM

Filed Feb. 24, 1943 6 Sheets-Sheet 1

INVENTOR.

John H. Homrighous

Oct. 3, 1950 J. H. HOMRIGHOUS 2,524,349

TELEVISION SYSTEM

Filed Feb. 24, 1943 6 Sheets-Sheet 2

INVENTOR.

John H. Homrighous

Oct. 3, 1950 J. H. HOMRIGHOUS 2,524,349

TELEVISION SYSTEM

Filed Feb. 24, 1943 6 Sheets-Sheet 3

INVENTOR.

John H. Homrighous

INVENTOR.
John H. Homrighous

TELEVISION SYSTEM

Filed Feb. 24, 1943

6 Sheets-Sheet 5

INVENTOR.

John H. Homrighous

Oct. 3, 1950

J. H. HOMRIGHOUS 2,524,349

TELEVISION SYSTEM

Filed Feb. 24, 1943

6 Sheets-Sheet 6

INVENTOR.

John H. Homrighous

Patented Oct. 3, 1950

2,524,349

UNITED STATES PATENT OFFICE 2,524,349

TELEVISION SYSTEM

John H. Homrighous, Oak Park, Ill.

Application February 24, 1943, Serial No. 476,897

8 Claims. (Cl. 178—6.8)

My invention relates to improvements in television communication systems. One of the main objects of my invention is an improved method for synchronizing the scanning devices and other mechanisms used in television.

Another object of my invention is an improved means for initiating the movement of picture films at the camera tube and at the picture tube.

Another object of my invention is the provision of means for producing an image on an endless image storage film, and for quickly projecting the image to the mosaic in the cathode ray pick up tube.

Another object of my invention is an improved means for developing synchronizing signals during the interval between scanned lines in a field and between the picture fields for controlling the scanning action at the transmitter and to modulate the carrier with the developed synchronizing signals, during the interval between scanned lines and picture fields to thereby govern the scanning action at the receiving station.

Another object of my invention is the provision of means for returning the cathode ray at the receiving station to its starting point from any location in the picture.

Several methods for developing and transmitting control frequencies have been devised; for instance, control frequencies have been developed by tuned circuits and transmitted separately from the video frequencies either as a separate modulation on a separate carrier, or in the interval between successive picture fields. In my prior application, Patent No. 2,309,393 of January 26, 1943, control signals are combined with the picture signals in such manner, that both are transmitted and reproduced as picture or video signals; and in my prior application Serial No. 451,722, filed July 21, 1942, now Patent No. 2,398,641, issued April 16, 1946, single impulses or control signals are developed at the end of each line and at the end of each picture field, and these signals are modulated on the carrier during the interval between lines and the interval between picture fields to control the horizontal and vertical scanning action at the receiving station.

In my present invention, I employ similar means to that shown in my prior application Serial No. 451,722, for developing control pulses for triggering or stopping the horizontal and vertical deflection of the cathode ray. The pulses are also employed to control the movement of an endless screen or motion picture film.

This synchronizing system may be known as "the follow up system," that is, the receiving station is not driven into sychronism but follows the horizontal and vertical movements of the transmitting station. Also, since no tuned circuits are used in developing the synchronizing signals this system is very flexible and will respond to any number of lines per picture and also to the present television standard of thirty pictures per second as well as to twenty-four pictures per second for motion picture film.

Different methods for stabilizing the frequency of oscillators have been developed such as a crystal control oscillator which generates a single fundamental frequency, thus limiting its flexibility; others employ means to eliminate the effect of a variable voltage supply. In my invention I provide a variable frequency oscillator having a frequency stabilizing unit for controlling the oscillator to maintain any desired frequency generated substantially constant.

In my prior application, Serial No. 451,722, I develop interlace scanning by causing the cathode ray in the first horizontal line in alternate fields to be returned from its mid-location to its starting point. In my present invention I provide an improved method for accomplishing the same result.

In my present invention I develop images from a scene on an endless fluorescent film or screen and initiate the step by step movement of this film or the step by step movement of a conventional motion picture film by the same vertical control pulse which returns the cathode ray to its starting point. No method heretofore has been developed for initiating the movement of the film at the camera tube by the scanning control impulse.

Figures 1, 2:
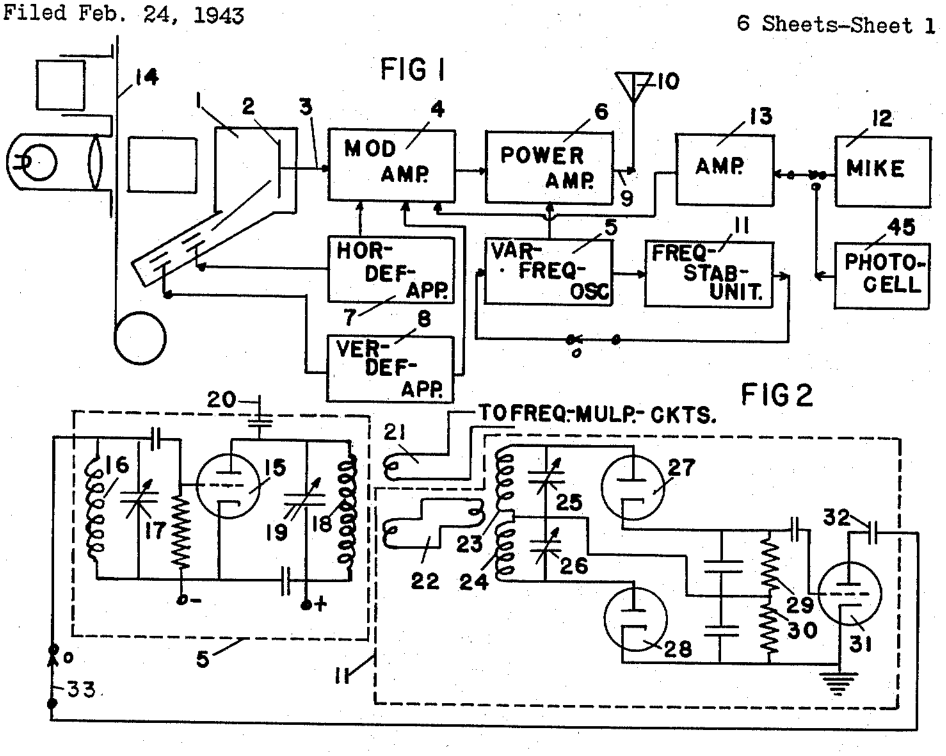
Figures 1 and 14 are simplified diagrammatic views of a television transmitting station, and a television receiving station, respectively, illustrating the principles applied in this invention.
Figure 2 is a schematic diagram showing an oscillator and a frequency stabilizer.

In Figure 1, the numeral 1 designates a cathode ray transmitting tube of conventional type and is known as an "iconoscope" or it may be a tube developed for perpendicular scanning of all points on the mosaic, and as illustrated it comprises a mosaic 2, photoelectric screen on which a light image of the object is projected and an electron gun for generating a ray of electrons directed at the screen, and two sets of deflecting plates for deflecting the electron ray at the line and field frequencies, so that it is caused to scan the screen. The picture is thereby developed and fed by an output connector 3 to a modulating amplifier 4.

A carrier wave is provided by an oscillator 5. In the power amplifier 6 this carrier wave is modulated by the frequency band video or picture signals and also by synchronizing impulses from the horizontal deflecting apparatus 7 and the vertical deflecting apparatus 8 between the horizontal lines and between the image fields through the modulation amplifier 4. The signals from the amplifier 6 are supplied by a connection 9 to the antenna 10. The oscillator 5 may be controlled by a frequency stabilizing unit 11.

The control or synchronizing signals and the video signals are transmitted on the same carrier. Sound signals may be transmitted on a separate carrier, or the signals from the microphone 12 after suitable amplification at 13 may be modulated on the same carrier as the video signals between the picture signals and the control signals for each horizontal line.

The image may be projected onto the mosaic screen 2 directly from a scene, or the image may be projected onto the mosaic from a moving film 14 disposed as shown, which is given intermittent movement by suitable mechanism to project each picture frame separately.

With reference to Figure 2, I have shown the variable frequency oscillator 5 having a tuned grid circuit and a tuned plate circuit; other types of oscillators may also be used, and as illustrated it comprises a tube 15, grid coil 16 with variable condenser 17 and plate coil 18 with variable condenser 19. This oscillator utilizes the grid plate capacity of the tube to provide feed back coupling between the two tuned coils. In operation the grid circuit and the plate circuit are tuned to approximately the same frequency, but the frequency of oscillations may be varied by adjusting the two tuned circuits. The high frequency oscillations may be supplied by conductor 20 to the power amplifier 6 or higher frequencies may be supplied from frequency multiplying circuits coupled to the oscillator, as shown at 21.

The frequency stabilizing unit 11 inductively coupled to the oscillator by the link 22 may be employed to stabilize or govern the oscillator frequency when a crystal is not used to control the freqeuncy, and has the advantage of stabilizing more than one frequency for which the oscillator may be tuned to develop. The stabilizing unit as shown utilizes the resonance characteristics of two tuned circuits having their resonance frequency equally spaced slightly above and below the desired frequency generated by the oscillator. The coils 23 and 24 may be tuned by the variable condensers 25 and 26 for resonance frequencies, one slightly higher and the other one slightly lower than the desired oscillator frequency. The output of these two tuned circuits is fed to two rectifier tubes 27 and 28 which are connected to the series load resistances 29 and 30 so that the voltages across these resistances are opposite and equal to the algebraic sum of the output voltage of each tube.

In operation, when alternating voltages of a desired frequency are transmitted from the oscillator the voltages across the load resistors 29 and 30 are equal and opposite, and as the oscillator frequencies vary from the desired frequency, previously determined by the adjustment of the condensers 17 and 19, the voltage across the load resistors becomes unequal, and a voltage equal to the difference between the two voltages appears across the resistances 29 and 30 and is applied to the grid of tube 31. The anode of tube 31 is connected in series with the condenser 32 and the switch 33 to the oscillator grid tank circuit. In operation the plate to cathode resistance of tube 31 may be variable, depending upon the changing potential supplied to the grid from the load resistors 29 and 30. This variable resistance in series with the condenser 32 will modulate or change the frequency in the oscillator 5. Therefore as the oscillator varies from the desired frequency at which it is tuned the frequency stabilizing unit 11 will operate to maintain the frequency substantially constant. The switch 33 may be turned to the off position should it be desired to operate the oscillator without the frequency stabilizing unit.

Figure 3:
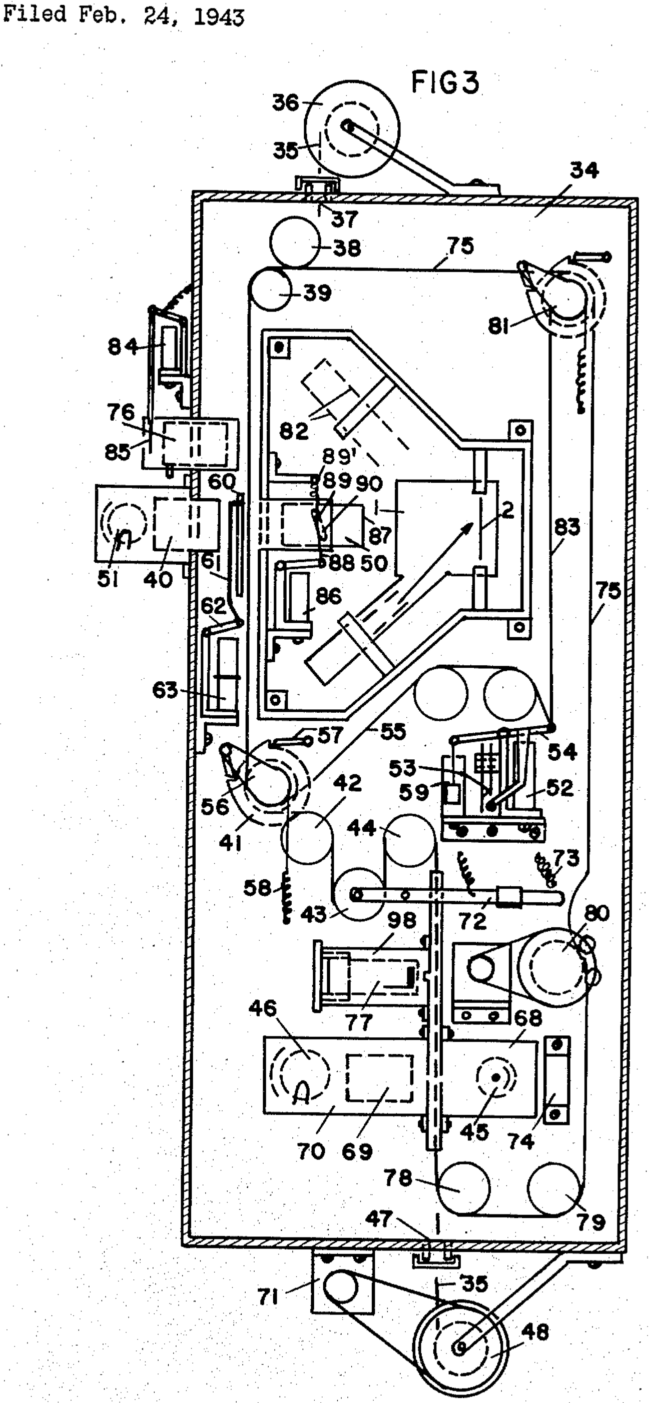
Figure 3 is an improved television camera having one side cover partially removed, showing the arrangement of the various pieces of associated mechanisms.

With reference to Figure 3, I have shown an improved television camera which comprises means for initiating the movement of the picture film by the synchronizing or control signals, and also the provision of an image storage screen or film to reduce the intensity of the light required on the scene being televised.

Heretofore to control the movement of a film in front of a cathode ray camera tube a continuously rotating member has been employed, which is very difficult to time or synchronize with the scanning operations of the cathode ray tube. In my invention I initiate the step by step movement of the film by the control impulse signals developed at the end of each field, which impulses also return the cathode ray in the camera tube to the starting point for the next picture field or frame; therefore regardless of the vertical scanning frequency the film movement will always be in synchronism with the changing picture fields in the camera tube.

In Figure 3 the numeral 34 represents a lightproof camera box having one cover removed to show the various pieces of apparatus contained therein for controlling the movement of a picture film, also the apparatus to record and to reproduce sound. The motion picture film 35 may be fed from the reel 36 through an opening 37 in the top of the camera box under sprocket wheel 38 and over the sprocket wheel 39, downward past the lens system 40, under the cam controlled sprocket wheel 41, over sprocket wheel 42, under idling wheel 43 and over sprocket wheel 44, then downward past the sound reproducing apparatus comprising a photocell 45 and its associated lamp 46 through the opening 47 in the bottom of the camera box and onto the reel 48.

Figure 5:
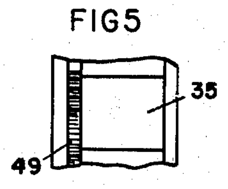
Figure 5 shows a portion of a picture film.

The moving picture film 35 is a regular conventional type of picture film having a continuous sound track 49 near one edge as illustrated in Figure 5. The cathode ray tube 1 in Figure 3 is mounted in a recess of the camera box and back of the lens systems 40 and 50. Images on the mosaic screen 2 are formed by the passage of light from the lamp 51 through the lens 40, film 35, and lens 50.

The film 35 is rapidly jerked downward or the step by step movement is caused by the relay 52 and its associated mechanism securely mounted on one side of the camera box 34 and comprising a pair of normally closed springs 53, opened by the action of armature 54. The armature 54 is connected by a cable 55 to the ratchet arm 56 so that the relay 52, which may be a solenoid, upon energizing operates its armature to communicate motion to the ratchet arm 56 which will rotate the sprocket wheel 41 to jerk or move the film downward one picture frame. The dog 57 holds the wheel and the film 35 in its operated position upon the deenergization of the relay 52. The ratchet arm 56 is then returned to its normal position by the spring 58 to engage another tooth in the sprocket wheel. The armature 54 may be connected to a dash pot mechanism 59 to govern the speed of its downward motion.

To shut off the light from the lamp 51 during the movement of the film 35 I provide a shutter 60 rotatably mounted on the frame or box 34 and attached by a rod 61 to the armature 62 of the relay 63, which relay is securely mounted on the inside of the camera box 34.

Figure 4:
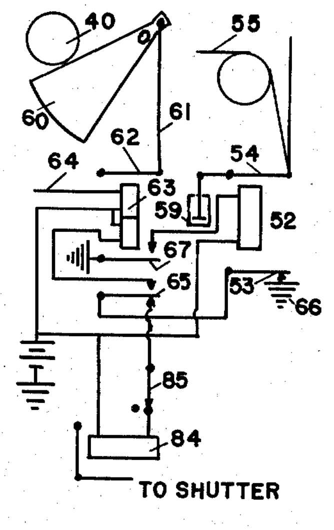
Figures 4 and 6 are schematic diagrams of camera control mechanisms with associated circuits.

Referring to the schematic circuit diagram of Figure 4 the upper winding of relay 63 is energized by control impulses momentarily applied to conductor 64 which are developed at the end of each scanned field or frame, to be more fully explained later. The relay 63 upon energizing operates the shutter 60 through the action of its armature 62 to shut off the light from the lens 40 as previously explained. The energization of relay 63 also causes the spring 65 to close a circuit from battery through the lower winding of relay 63, spring contacts 53 to ground at 66. This winding holds the relay 63 in its operated condition and therefore the shutter 60 shuts off the light from the lens 40 until the movement of the film is completed. The spring 67 is also operated by the energization of relay 63 to close a circuit from battery through the relay 52 to ground. The relay 52 as previously explained through the operation of its armature 54 moves the film downward the distance of one frame. The springs 53 are adjusted to break an instant before the armature 54 is completely operated thereby opening the circuit through the lower winding of relay 63 whereupon relay 63 will deenergize, which will also cause relay 52 to release its armature to normal condition. This operation is repeated at the end of each scanned field or frame.

The conventional motion picture film is provided with a continuous sound track as illustrated at 49, Figure 5, and in order to transmit these sound effects to the receiving stations I provide reproducing mechanism in the lower portion of the camera box comprising a photo tube 45 in a lightproof compartment 68; this tube is responsive to changes in light intensities caused by the continuous movement of the sound track by the motor 71 through a beam of light projected from the lamp 46 through the lens system 69 toward the photocell 45. The lamp 46 may be in a lightproof compartment 70. The sound signals from the photocell 45 after suitable amplifications may be transmitted on a separate carrier or they may be modulated on the same carrier as the video signals to be fully explained later.

Figure 6:
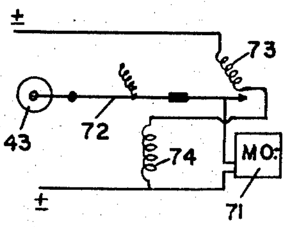

The motor 71 drives the wind up reel 48 to pull the film 35 past the sound reproducing mechanism in a continuous motion. The motor may be started or stopped and its speed regulated by the action of the arm 72, which is responsive to the amount of slack in the film as indicated by the idling pulley 43. For instance, when the film is jerked downward by the ratchet wheel 41 the idling pulley 43 will drop, causing the arm 72 to move over the resistance 73, closing the circuit to the motor 71 through an auto transformer 74, as illustrated in the schematic circuit diagram of Figure 6. Should the frame scanning speed be increased the film would travel faster toward the pulley 43 allowing it to drop further to thereby adjust the slide arm 72 to increase the potential applied to the motor. Should the scanning mechanism be switched off the relay 52 would now remain inoperative and the motor 71 would pull the film downward causing the pulley 43 to move the arm 72 to the off position, thereby stopping the motor.

One of the chief purposes of the lightproof camera box is to provide a dark compartment for aging a transluscent picture film having a coating of luminescent material for storing an image for a short period of time. In other words, in place of the conventional moving picture film described above, I may employ a transparent film coated with a fluorescent material having a short interval of light storage so that an image of a scene may be stored on the film until the film can be moved in the path of a strong light to project the image onto the mosaic of a cathode ray tube. This film may have a sound track which is similar to the sound track illustrated in Figure 5.

With further reference to Figure 3, the endless image storage film 75 which may be made either from a transparent material coated with a luminescent substance or from a fabric impregnated with luminescent material may be used in the camera box 34 in place of the conventional moving picture film 35. The film 75 may pass over the sprocket wheel 39 then downward past the lens systems 76 and 40, under the sprocket cam controlled ratchet wheel 41, over wheel 42, under idling wheel 43, over wheel 44, then downward past the glow lamp 77, and photocell 45, under sprocket wheels 78 and 79, engaging the motor driven sprocket wheel 80, and over the cam controlled ratchet wheel 81.

The operation is as follows: light reflected from the object or the scene being televised is projected through the lens system 76 onto the image storage film 75 at a distance of several frames above the lens systems 40 and 50. The film is jerked downward step by step by the relay 52 at the end of each scanned field or frame as previously described to bring each picture frame in alignment with the lens systems 40 and 50 where the images on the storage film will be projected onto the mosaic 2 of the cathode ray tube 1, similar to the picture projection from the moving picture film 35.

The tones or shades on the luminescence film 75 are exactly as they appear in the scene, that is, black is black or the luminescence film may be known as a positive image film.

The images projected from the storage film 75 will be reversed from those projected from the film 35, therefore when using luminescence screen 75 I turn the pick up tube 1 upside down as indicated by the dashed lines at 82.

The relay 52 by the attached cable 83 operates the cam controlled ratchet wheel 81 in step with the ratchet wheel 41 to assist in moving the endless film about the camera box 34. The relay 63 is operated from control signals developed at end of each frame to in turn move the shutter 60 in front of the moving film as previously explained. The relay 63 upon releasing will close an energizing circuit for relay 84 through the switch 85. The switch 85 being open when using motion picture film. The relay 84 is mounted above the lens system 76 and operates or trips the camera exposure shutter 85 after each movement of the luminescence storage film.

Relay 86, mounted at the side of the lens system 50 and energized during alternate frames, to be explained more fully later, will rotate the lens holder 87 by the movement of its armature and the attached cable 88 secured to the pin 89. The downward movement of pin 89 in the angularly located slot 90 causes the lens holder 87 to move closer to the mosaic 2 which will slightly change the focus of the image at the mosaic. The lens system is returned to its normal position by a spring 89′. The reproduced images will appear closer in alternate frames than they will in the intervening frames, thus giving the effect of more depth to the pictures.

From the foregoing description it will be understood that either a conventional motion picture film, or an image storage luminescent film may be used with the cathode ray pick up tube to develop video signals from a scene at approximately the time of its occurrence. Furthermore, the cathode ray tube may be used without either of the above mentioned films to develop picture signals directly from a scene.

The glow lamp 77 is for recording sound effects on the film 75. Since the storage film 75 has a certain definite delay interval from the taking of a picture until it is projected onto the mosaic 2, the glow tube 77 is arranged at a certain distance above the sound pick up photocell 45 so that the sound may be transmitted with the picture with which it is associated.

Figure 7:
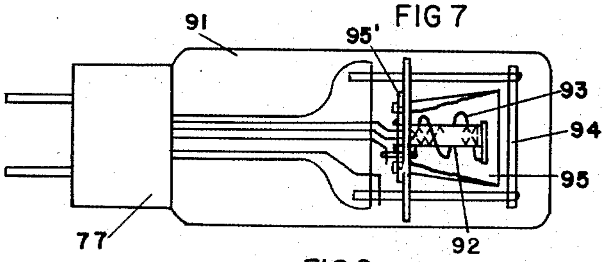
Figures 7 and 8 are detail views of an improved glow lamp.
Figure 8:
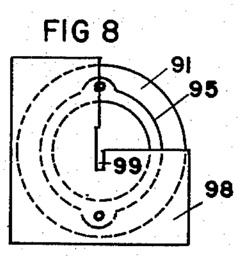

The glow lamp 77 may be of a known conventional type; however, I prefer to use the improved glow lamp shown in Figures 7 and 8, wherein 91 is a glass evacuated bulb or envelope, containing an indirectly heated cathode 92, a control grid 93, an anode 94 close to the end of the glass bulb constructed with a fine wire mesh filled with luminescent material, and a beam forming plate 95 having the same potential as the cathode to direct the electrons toward the anode. The lower end of the plate 95 is shielded by the closure 95′ attached to the plate 95.

Figure 9:
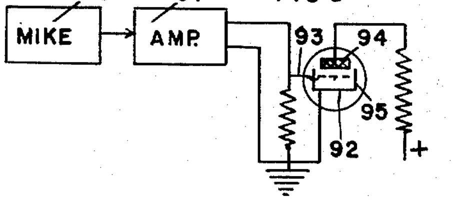
Figure 9 shows a circuit arrangement for the glow lamp.

Referring to Figure 9, the operation is as follows: sound signals from the microphone 96, after suitable amplification at 97, are supplied to the control grid 93 to vary the number of electrons flowing from the cathode 92 to the anode 94. The anode 94 is responsive to the intensity of the electrons reaching its surface to change its brilliancy. The glow lamp 77 is placed inside a metal container 98 as shown in Figure 3. In the end of the metal container there is a narrow rectangular aperture 99 as shown in Figure 8. The film 75 is continuously moving past the narrow aperture 99 so that the different degrees of brilliancy may be recorded in the sound track area on the luminescence film 75, to be reproduced a short interval thereafter by the photocell 45.

Figure 10:
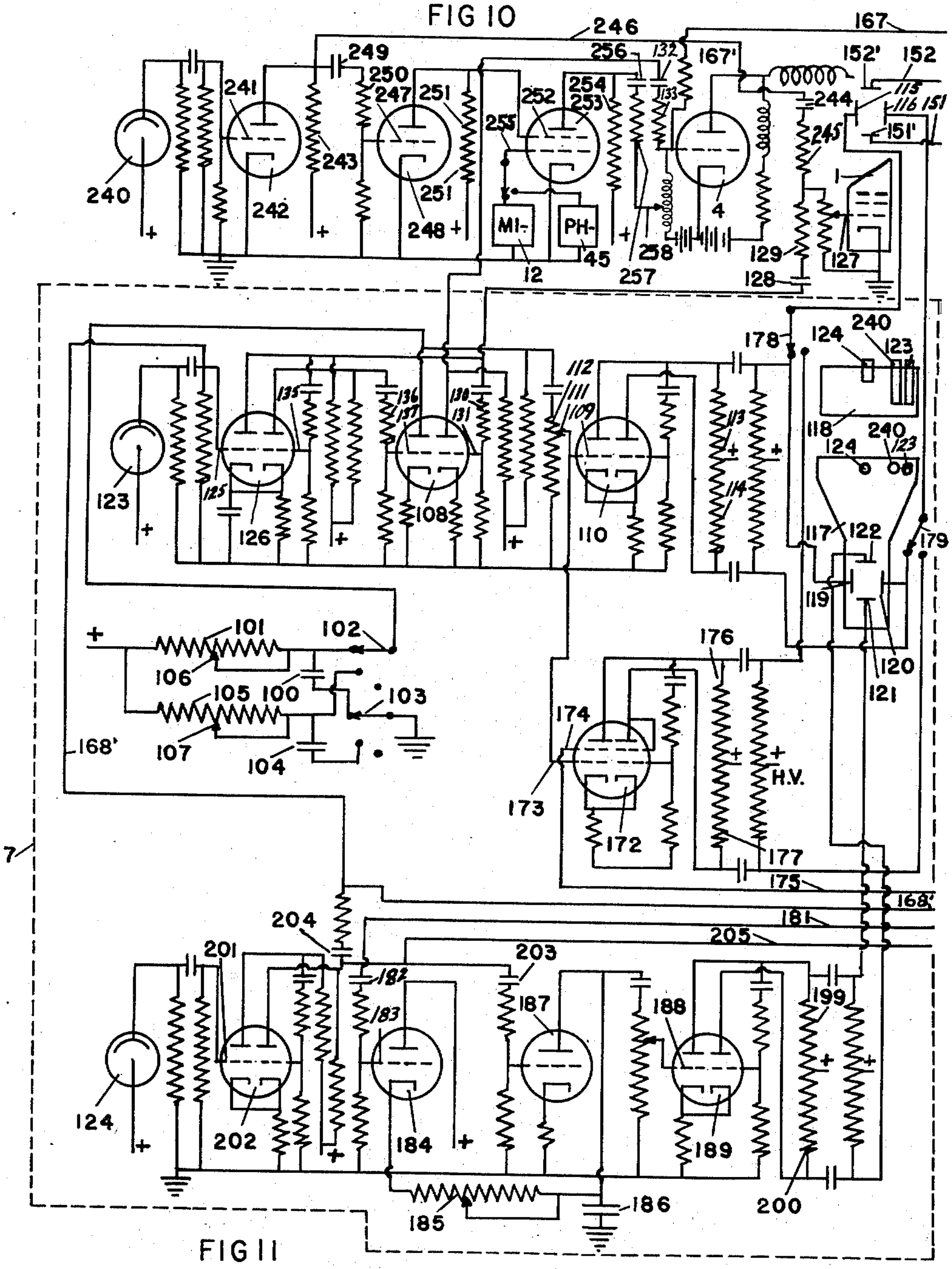
Figures 10 and 12 are diagrammatic views of the horizontal and vertical deflecting apparatus respectively, shown in Figure 1.

With reference to Figure 10, the apparatus 7 for horizontal deflection comprises a condenser 100 charged through an adjustable resistance 101 from a source of positive voltage as indicated. By movement of the switches 102 and 103 another condenser 104 may be charged through resistance 105 from a source of high voltage to supply a different line frequency for horizontal deflection. Charging current control may also be obtained by varying the resistances through movable contacts 106 and 107 to give close frequency adjustments. Further line frequency variations may be obtained by providing other resistances and condensers connected to the vacant switch contacts.

When the condenser 100 or 104 becomes charged, depending upon which switch contacts are closed, the saw-tooth voltage wave in the plate circuit of tube 108 is impressed on the grid 109 of multi unit tube 110 through an adjustable contact 111 on the voltage dividing resistance 112 which contact is for controlling or adjusting the amplitude of the saw tooth voltage wave. The output of the push-pull amplifier 110 supplied to the load resistors 113 and 114 will change the potential on the horizontal deflecting plates 115 and 116 of tube 1 to effect in a well known manner the forward movement of the cathode ray.

To initiate the discharge of the condenser 100 or 104 I provide an auxiliary scanning device or a cathode ray tube 117 of conventional type similar to tube 1 except that it may be of smaller size and it may comprise a fluorescent screen 118 of rectangular shape, and an electron gun for developing a ray of electrons directed toward the screen. The control electrode of this tube is biased to produce a constant intensity electron ray. Two sets of electrostatic plates may be furnished, one set 119 and 120 to control the deflection of the electron ray lengthwise the screen, and another set 121 and 122 to control the deflection of the electron ray in a direction perpendicular to the length of the screen. Three photoelectric cells in separate evacuated bulbs are provided inside the cathode ray tube 117. One photocell 123 extends across the tube near one edge of the screen and another photocell 124 is placed near the center of the screen. The glass evacuated bulbs of these photocells may be coated with luminescent material similar to the screen in the cathode ray tube except that the coating on the photocells may have a shorter persistence time.

The deflecting plates 119 and 120 are connected parallel to the deflecting plates 115 and 116 of tube 1 so that the cathode ray in both tubes travels across their respective screens in synchronism.

Figure 11:
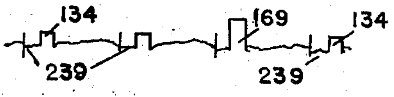
Figure 11 is a graphical view showing horizontal and vertical synchronizing impulses.

When the cathode ray tube 117 arrives at the edge of the screen having the photocell 123, the change of light in the photocell, due to the electron ray impinging the fluorescent material on the outside of the photocell causes a voltage impulse to be applied to the grid 125 of the double triode tube 126. The voltage change on the grid of tube 126 causes several things to happen: first, the signal after amplification in the anode circuit is applied to the control grid 127 of tube 1 through condenser 128 and resistance 129 to extinguish or lower the intensity of the electron ray during its backward movement or retrace period; second, this signal is applied through resistances 130 to grid 131 of tube 108 and after amplification in the anode circuit it is applied through the coupling condenser 132 and resistance 133 to the grid of the modulating video amplifier 4 for modulating the carrier with a high amplitude impulse during the backward movement of the electron ray or the retrace period as illustrated at 134, Figure 11, to thereby control horizontal deflection at the receiving stations; third, this signal is also applied to the second grid 135 of tube 126 and after amplification in its anode circuit it is then applied through resistance 136 to the grid 137 of the trigger tube 103. This tube then becomes conductive to discharge either of the connected condensers 100 or 104.

From the foregoing it will be understood that the photocell 123 initiates the cut off or horizontal return trace of the cathode ray, modulates the carrier with a high amplitude signal wave between horizontal lines, and also reduces the intensity of the electron ray in tube 1. Furthermore, line frequency may be varied to meet any operating condition through the adjustment of the variable resistances 101 and 105 and the condensers 100 and 104. The amplitude or width of the pattern scanned may be adjusted by the movable contact 111.

Figures 12, 13:
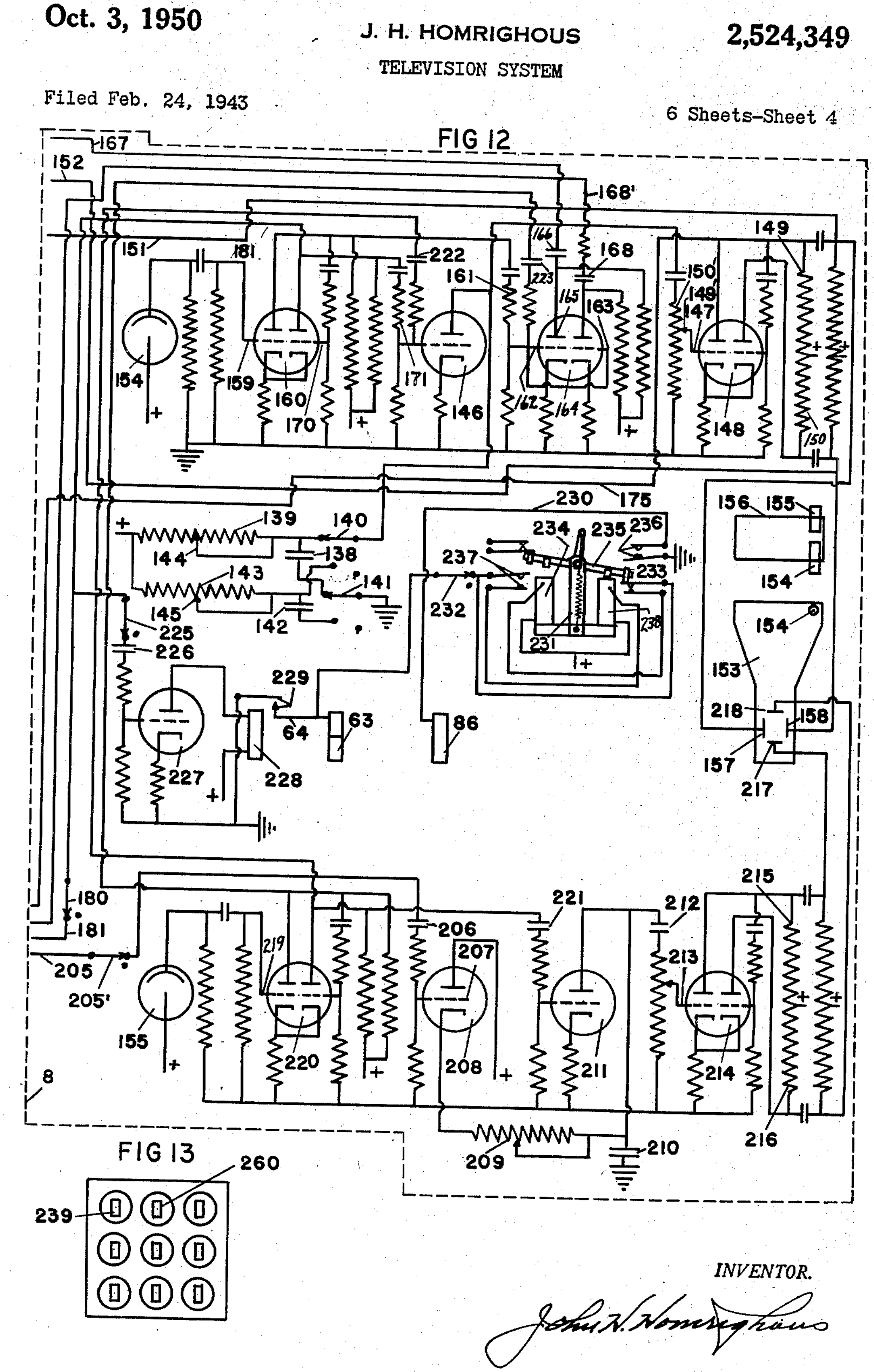
Figure 13 is a diagrammatic view of the arrangement of several glow lamps for multiplex communication.

With reference to Figure 12, the vertical deflecting apparatus 8 is quite similar to the horizontal deflecting apparatus 7 and comprises a condenser 138 charged through an adjustable resistance 139 from a source of positive voltage as indicated. By rotating the switches 140 and 141 another condenser 142 may be charged through the resistance 143 from the source of high voltage to supply different predetermined frame or picture frequencies. Charging current control may also be obtained by varying the resistances 139 and 143 through the movable contacts 144 and 145, to give close frame frequency adjustments.

When the capacitances 138 or 142 become charged depending upon which contacts are closed, the saw tooth voltage wave in the anode circuit of tube 146 is impressed on the grid 147 of the double unit tube 148 through an adjustable contact 149 on the voltage dividing resistance 150 which contact is for controlling or adjusting the amplitude of the saw tooth voltage wave. The output of the push pull amplifier tube 148 supplied to the load resistances 149′ and 150′ will change the potential via conductors 151 and 152 on the vertical deflecting plates 151′ and 152′ of tube 1 to effect the forward movement of the electron ray.

To initiate the discharge of condensers 138 or 142 I provide an auxiliary vertical scanning device or cathode ray tube 153 of conventional type and similar to tube 117 previously described except that it has two photocells 154 and 155 in separate evacuated bulbs extending inside of the tube 153 and near the cathode ray leaving edge of the screen 156.

The plates 151′ and 152′ are connected in parallel to the deflecting plates 157 and 158 respectively in tube 153, so that the movement of the electron ray across their respective screens will be in synchronism.

When the electron ray of tube 153 arrives at the edge of the screen having the photocell 154, the change in intensity of light to the cell caused by the electron ray impinging the fluorescent material on the outside of the photocell bulb will cause a voltage impulse to be applied to the grid 159 of the double triode tube 160. The voltage change on the grid of tube 160 initiates three conditions; first, the signal after amplification in the plate circuit is applied through resistance 161 to the grids 162 and 163 of the double triode 164; after suitable amplification the signal is supplied from anode 165 to coupling condenser 166, conductor 167, resistance 167′ to the grid of modulation amplifier 4 for modulating the carrier with a high amplitude impulse between picture fields or during vertical retrace. The second condition is as follows: the signal amplified in the second plate circuit of tube 164 is applied through coupling condenser 168, conductor 168′ to the grid of tube 126 in the horizontal deflecting apparatus 7 to cause, as previously explained, the return of the electron ray to its horizontal starting position, lowering the intensity of the electron ray, and modulating the carrier with a high amplitude signal in synchronism with the modulating signal from the tube 164. The modulation of the carrier with two signals of large amplitude in synchronism will produce a signal having an amplitude greater than either of the signals alone, as illustrated at 169, Figure 11. The third condition is as follows: the signal on grid 159 after amplification is also applied to the grid 170 of tube 160 and after suitable amplification in its anode circuit it is applied through resistance 171 to the grid of the trigger tube 146. This tube then becomes conductive to discharge either of the condensers 138 or 142.

When certain types of camera tubes are used such as illustrated in Figure 1 it may be necessary to make corrections in the horizontal line deflection for the "Keystone" effect and in order to do this I provide a push-pull amplifier screen grid tube 172, Figure 10, having a control grid 173 connected in parallel to the grid 109 of the amplifier 110. The screen grid 174 is connected by a conductor 175 to the load resistor 149 to gradually vary the tube output in accordance with the field deflection. The output of the push-pull amplifier 172 supplied to load resistances 176 and 177 will now change the potential on the horizontal deflecting plates 115 and 116 through the switches 178 and 179 to correct for unequal amplitudes for horizontal scanning when a pick-up tube having its image plate inclined to the scanning beam is used at the transmitter.

From the foregoing it will be understood that the photocell 154 initiates the return of the electron ray both vertically and horizontally to its starting point between fields, modulates the carrier with a high amplitude pulse between fields or picture frames, and also lowers the intensity of the electron ray between fields, simultaneously during the retrace period. Furthermore, line and frame frequency may be varied to meet any operating condition such as twenty-four or thirty pictures per second. By observing the sweep or otherwise timing the cathode ray in tube 153 it may be adjusted through the variable resistances 139 and 143 and the condensers 138 and 142 to operate at a particular frequency while the amplitude may be adjusted by the movable contact 149 to give the desired height scanned on the mosaic or to cut off the vertical deflection at any desired number of lines per field.

To provide interlace scanning, where the lines of one field fall in between the lines of the previous field, some means for delaying the line scanning in alternate fields must be provided since the field retrace control pulse also returns the horizontal movement of the cathode ray to its starting point which will cause the electron ray to travel in almost a vertical direction during retrace instead of backward and forward across the image screen.

In order to accomplish the above method of interlace, where the number of lines per frame, and the number of frames per second may be varied as desired, I employ apparatus to deflect momentarily the electron ray in the scanning control devices for exciting other photoelectric cells in the scanning devices to thereby control the horizontal deflection so that the first line in alternate fields will only be one half the length of the other scanned lines, which will have the effect of moving the electron ray in the camera tube vertically in alternate fields a distance of one half of the space between lines.

With further reference to Figure 12, to control interlace scanning, a voltage pulse is developed each time that the photocell 154 is excited to initiate the return of the electron ray to its starting point in the second anode circuit of tube 160, and applied through the switch 180, conductor 181, condenser 182, to the grid 183 of tube 184, Figure 10. This positive pulse on the grid of tube 184 allows current to flow through resistance 185 momentarily to charge the condenser 186. This causes a voltage change in the plate circuit of tube 187 which is impressed on the grid 188 of the double triode tube 189. The output from the amplifier tube 189 is supplied to the load resistors 199 and 200 to alter the potential on the deflecting plates 121 and 122 of the scanning control tube or device 117 to deflect the electron ray in a direction perpendicular to the length of the screen. This small deflection of the cathode ray in tube 117 will only be for a short time, since the cathode ray during its first horizontal movement after vertical retrace will impinge the fluorescent coating on the photocell 124 located approximately in the middle of the screen but normally out of the path of the cathode ray. The change of light in this photoelectric cell causes a voltage impulse to be applied to the grid 201 of the double triode amplifier 202. The voltage change on the grid of tube 202 causes several things to happen; first, the signal or voltage impulse after amplification in the second anode circuit is applied to the grid of trigger tube 187 through coupling condenser 203. This tube then becomes conductive to discharge the condenser 186 thus restoring the cathode ray in tube 117 to its normal position; second, the signal is applied through coupling condenser 204, conductor 168' to the grid 125 of tube 126 thus causing the cathode ray of tubes 1 and 117 to return to their starting points as previously described but, after only one half of the distance of a horizontal line was scanned, which will have the effect of locating successive scanned lines in between the scanned line locations of the previous field; third, the signal or impulse from the second anode circuit of tube 202 is also applied over conductor 205, through switch 205' and coupling condenser 206 to the grid 207 of tube 208. This positive pulse on the grid of tube 208 allows current to flow through resistance 209 momentarily to charge the condenser 210. This causes a voltage change in the plate circuit of tube 211 which is applied through blocking condenser 212 to the grid 213 of the double amplifier tube 214. The output from the amplifier tube 214 is supplied to the load resistances 215 and 216 to change the potential on the deflecting plates 217 and 218 of the scanning control tube or device 153 to deflect the electron ray in a direction perpendicular to the length of the screen. This deflection of the cathode ray will cause it to impinge the fluorescent coating on the photocell 155 instead of the photocell 154 at the end of the vertical deflection. The change of light in the photocell 155 causes a voltage impulse to be applied to the grid 219 of the double triode amplifier 220. The voltage change on the grid of tube 220 causes several things to happen; first, the signal or voltage impulse after amplification in the anode circuits is applied to the grid of the trigger tube 211 through the blocking condenser 221. This tube then becomes conductive to discharge the condenser 210 thus restoring the cathode ray in tube 153 to its normal position; second, the signal is applied through coupling condenser 222 to the grid of trigger tube 146 and also the signal is applied through coupling condenser 223 to the grid 162 of tube 164 thus causing the cathode ray in tubes 1 and 153 to return to their starting points as previously described.

From the above description it is shown that the scanning cycle will keep repeating, that is, the cathode ray in the vertical scanning control device 153 will alternately excite the photocell 154 and 155 to cause vertical retrace, etc., and each time that the photocell 154 is excited it causes the photocell 124 in the line control device 117, Figure 10, to become excited, thereby causing the line locations scanned on the image plate in alternate fields to fall in between the line locations scanned in the intervening fields. The switches 180 and 205' would be opened for progressive scanning.

The cathode ray pick-up or camera tube 1 may be operated as described for transmitting images developed from a scene or it may be used in connection with the camera box as shown in Figure 3 to transmit images of pictures on a moving picture film or from a memory or luminescent film.

The movement of the film in front of the camera tube by rapid jerks at the end of each picture field or frame depending upon whether interlace or progressive scanning is used, may be initiated by the voltage impulse occurring in the tube 160, Figure 12, during retrace. This voltage impulse in the anode circuits of tube 160 is applied through the conductor 181, switch 225, coupling condenser 226, to the grid of tube 227. The voltage impulse on the grid of tube 227 causes the sensitive relay 228 to be momentarily energized, closing its spring contacts 229 to place ground potential on conductor 64 thus energizing the shutter control relay 63 mounted in the camera box 34, which causes the motion picture film to be moved or jerked downwardly at the end of each picture field or frame as previously explained.

The relay 86 mounted on the camera box 34 for changing the focus of the image projected to the image plate may be energized at the end of every other vertical sweep or at the end of each picture field over conductor 230 through the action of toggle or flip-flop double coil relay 231, Figure 12. The relay 231 may be operated during each vertical retrace period when progressive scanning is employed, or it may be operated only during every other vertical retrace period since the tube 160 is excited every other vertical sweep for interlace scanning. The ground potential at springs 229 is applied through the switch 232, which is opened when changes in focus on the image plate are not desired; contacts 233, coil 234 to battery thus momentarily energizing the coil 234 to pull the armature 235 toward its pole piece where it will remain until the relay 228 is again energized. The energization of coil 234 closes the spring 236 placing ground potential on conductor 230, thus energizing the relay 86 thereby adjusting the lens system 50 to alter the focus on the image plate. The energization of the coil 234 also opens springs 233 and closes springs 237 so that when the relay 228 is again energized during vertical retrace a circuit will be closed to the coil 238. The energization of coil 238 operates the armature 235 to open the circuit of the focus control relay 86 at springs 236 thereby changing the focus on the image plate 2 to normal.

From the above description it is shown that the relay 86 may be energized during every other vertical retrace period for progressive scanning or it may be energized only during each frame period for interlace scanning, to project the images toward the image plate or mosaic having a certain focus for alternate periods and a different focus for the intermittent periods, thereby, giving the illusion of depth in the reproduced pictures.

Sound signals may be transmitted on a separate carrier; however, I prefer to modulate the sound signals on the same carrier with the video signals but each having a separate period of time. In order to accomplish this the scene may be focused toward one side of the image plate leaving a small narrow space for sound at the cathode ray leaving edge of the image plate or mosaic, as illustrated at 239, Figure 11. This requires some means of automatically stopping or cutting off modulation of the video signals before the cathode ray reaches the edge of the image plate and at the same instant to start modulating the carrier by sound signals. To effect the change from modulating the carrier with video signals to modulating the carrier with sound signals or vice versa I employ a third photoelectric cell 240 located in the cathode ray scanning device 117 so that the cathode ray will impinge its outer coating of luminescent material once for each horizontal line for a short period of time before impinging the photocell 123. This causes an increase of intensity of light in the photocell 240, thereby increasing the potential on the grid 241 of the tube 242 causing a voltage drop in the load resistance 243 which is applied through condenser 244 and resistance 245 and conductor 246 to the control grid 127 of the cathode ray pick-up tube 1 to extinguish or lower the intensity of its cathode ray whereby video signals will not be developed during the interval of increased light in the photocell 240. The voltage drop in the load resistance 243 is also applied to the grid 247 of the tube 248 through the condenser 249 and resistance 250. The tube 248 is biased so that normally current will flow through its load resistance 251 producing a large voltage drop. This low voltage is applied to the screen grid 252 of amplifying tube 253. The normal low positive voltage applied to the grid 252 is considerably below the positive voltage applied through load resistance 254 to the anode and is of such value that it normally nullifies the conductivity of the tube 253 during the period that the video signals are being modulated on the carrier. However, the negative pulse applied to the grid 247 of tube 248 is of sufficient value to stop the flow of current through the tube, thereby increasing the potential on the screen grid 252 whereupon the microphone 12 or photocell 45, depending upon whether the sound effects are being transmitted directly from the microphone or whether they are being reproduced from the film in Figure 3, may vary the potential on the control grid 255 to vary the output of tube 253 in accordance with sound vibrations. The variable output voltage is applied through condenser 256 and resistance 257 and conductor 258 to the input circuit of modulation amplifier 4 to modulate the carrier with sound signals between the video signals and the synchronizing pulses. Therefore, video and sound signals are modulated on the same carrier at different intervals.

With reference to Figure 13 I have shown several glow lamps similar to that of Figure 9 which may be employed for multiplex communication. The glow lamps 259, 260, etc., are preferably placed in horizontal rows within the view of the cathode ray camera tube preferably and "orthicon," whereby the cathode ray may scan the image for each row of glow lamps once for each vertical field in which case a field would consist of only three or four horizontal lines. Each of the glow lamps may be connected to an individual microphone as in Figure 9, or telegraph apparatus, or they may be arranged to transmit code characters where each lamp would be arranged to indicate a space or mark. Should only one row of glow lamps be used then the vertical sweep would be confined to a narrow space the width of only a few lines.

Figure 14:
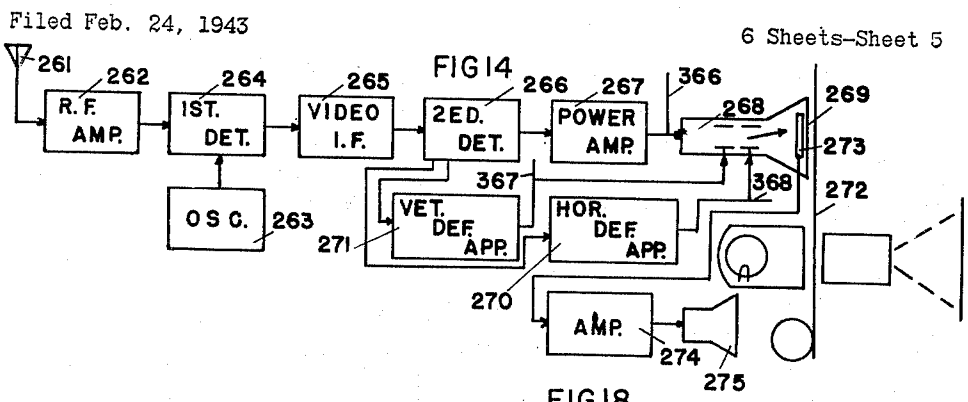

With reference to Figure 14, showing a receiving station, the antenna 261 receives the carrier signals from the transmitter antenna 10 to a radio frequency amplifier 262. An oscillator 263 reacts with these signals in the first detector stage 264 on the superheterodyne principle to produce an intermediate frequency which is supplied to the video intermediate frequency stage 265. After suitable amplification the video signals and the control signals are detected at 266 and applied to the power amplifier 267 and after amplification in this tube they are applied to the picture tube or scanning device 268. The device 268 is represented as being in the form of a cathode ray tube of a conventional type and comprises a fluorescent screen 269, an electron gun for developing a ray of electrons directed at the screen, and two sets of electrostatic plates for deflecting the electron ray at the line and field frequencies to cause it to scan the screen. The video signals are applied to the control electrode of the electron gun, whereby, the intensity of the electron ray is made to vary with the video or picture signals. The horizontal deflecting apparatus 270 receives the line synchronizing impulses from the second detector output, and the vertical deflecting apparatus 271 likewise receives its control signals from the output of the second detector.

The images from the screen 269 may be impressed on a luminescent coated film or rotating member 272 disposed as shown which may be given an intermittent movement by suitable mechanism in front of a suitable lamp to project each picture separately.

Figure 15:
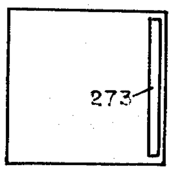
Figure 15 is a diagrammatic view of a picture tube screen having a photo electric cell arranged for the reception of sound.

Sound signals may be transmited on a separate carrier or they may be transmitted as part of the video signals as shown in my prior application mentioned above. In my present invention the sound signals may be transmitted on the same carrier as the video signals but during an interval between the picture signals and the control or synchronizing signals. A photoelectric cell 273 preferably placed on the inside of the cathode ray tube arranged at one side of the tube as illustrated in Figure 15 and having a coating of luminescent material with a rather fast decay period, so that the sound signals at the end of each horizontal line will cause various degrees of light intensities in the photocell 273 to vary its signal current output. These variations in signals after amplification at 274 are reproduced as sound at the speaker 275.

Figure 16:
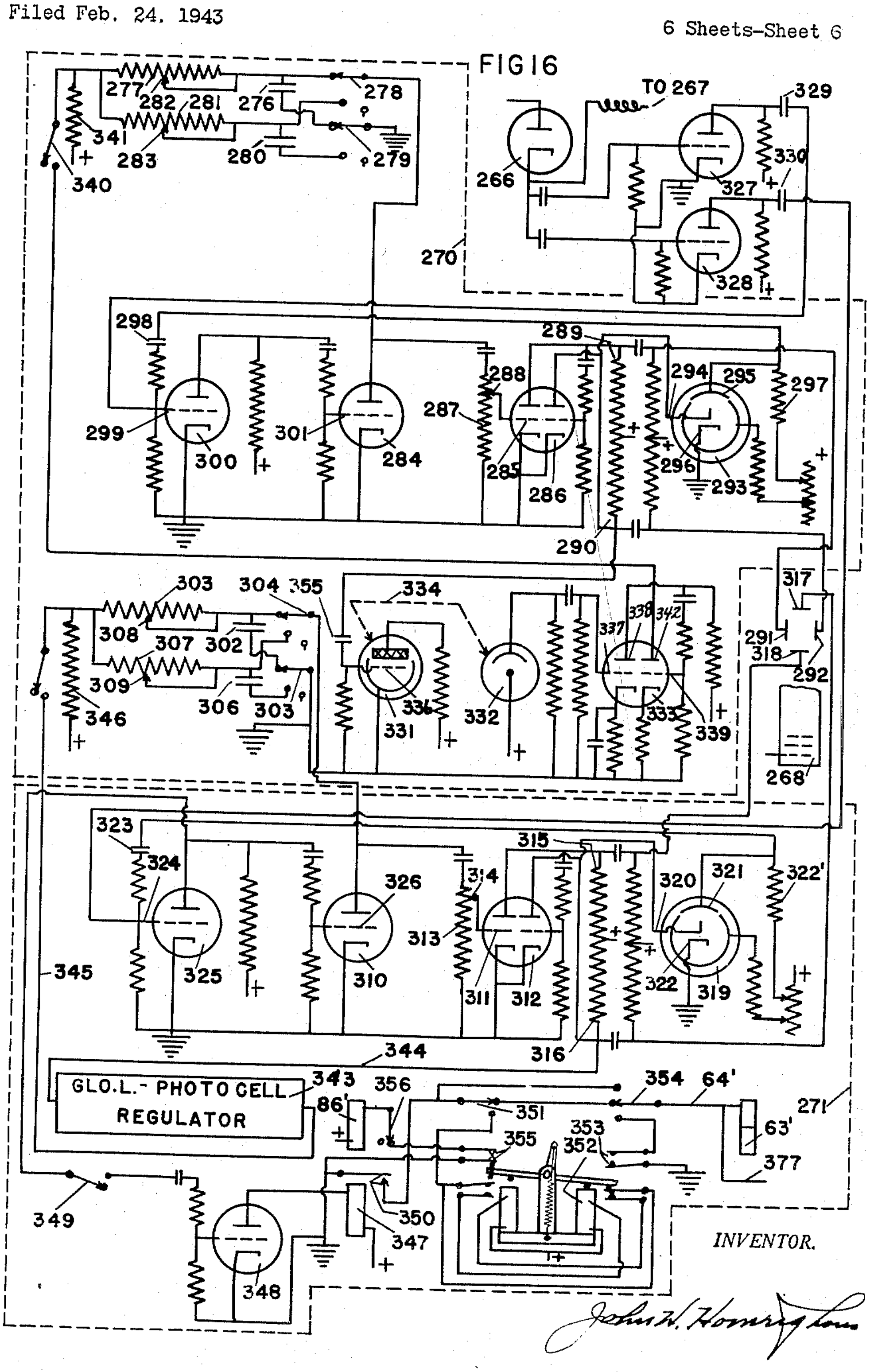
Figure 16 is a diagrammatic view of the horizontal and vertical deflecting apparatus illustrated in Figure 14.

With referene to Figure 16 the deflecting apparatus 270 and 271 are very similar to that described for the transmitter. The apparatus 270 for horizontal deflection at the receiver, comprises a condenser 276 charged through a variable resistance 277 from a positive source of potential as indicated. By adjusting the switches 278 and 279 other condensers such as 280 may be charged through other resistances such as 281 from a source of high potential to supply different line frequencies for horizontal deflection. Charging current control may be obtained by varying the resistance through movable contacts 282 and 283 to give close frequency adjustments.

When the voltage across condenser 276 gradually increases or the condenser 280 depending upon which switch contacts are closed, the saw tooth voltage wave in the plate circuit of tube 284 is impressed on the grid 285 of the double purposes tube 286 through a voltage dividing resistance 287 and the adjustable contact 288 for controlling the amplitude of the saw tooth voltage waves. The output of the double purpose amplifying tube 286 is applied to the load resistances 289 and 290 to change the potential on the horizontal deflecting plates 291 and 292 of tube 268 to effect the forward movement of the cathode ray.

To initiate the discharge of condensers 276 or 280 in the absence of signal I provide an "off and on" electron relay tube 293. This tube has been described in my prior application Serial No. 472,105, filed January 12, 1943, now Patent No. 2,437,027. The tube 293 may comprise a control electrode 294 for deflecting the electrons to and from the anode 295.

When the voltage at the load resistance 290 is increasing the potential on control electrode 294 will also increase until its potential is approximately the same as the potential of the anode 295. This will cause the electrons to flow from the cathode 296 to the anode 295 thus lowering the potential at the load resistance 297 which is applied through condenser 298 to the grid 299 of tube 300. This change in potential after amplification in tube 300 is applied to the grid 301 of trigger tube 284. This tube then becomes conductive to discharge the condenser 276 returning the electron ray in tube 268 to its line starting position. Discharging the condenser 276 also decreases the potential at load resistance 290 thus lowering the potential of the control electrode 294 thereby causing the deflection of the electrons from the anode 295.

With further reference to Figure 16, the vertical deflecting apparatus 271 is similiar to the horizontal deflecting apparatus 270, and comprises a condenser 302 charged through a variable resistance 303 from a source of positive potential as indicated. By rotating the switches 304 and 305 another condenser 306 may be charged through a resistance 307 from the source of positive potential to thereby supply different frame or picture frequencies. Charging current control may also be obtained by varying the resistances through the movable contacts 308 and 309 to give close frame frequency adjustments.

When the voltage across the condenser 302 increases the saw tooth wave in the plate circuit of tube 310 is impressed on the grid 311 of tube 312 through the resistance 313 and the adjustable contact 314 for controlling the amplitude of the vertical saw tooth wave. The output of double purpose amplifier tube 312 is applied to the load resistances 315 and 316 to increase and decrease the potential on the vertical deflecting plates 317 and 318 of tube 268 to effect the vertical movement of the electron ray.

To initiate the discharge of the condensers 302 or 306 in the absence of control signals I provide an "off and on" relay tube 319 similar to tube 293 and may comprise a control electrode 320 for deflecting the electrons to and from the anode 321.

When the voltage at the load resistance 316 is increasing the potential on the control electrode 320 will also increase until its potential is approximately equal to the potential on the anode. This will cause the electrons to flow from the cathode 322 to the anode 321 thus lowering the potential at the load resistance 322 momentarily which is applied through the condenser 323 to the grid 324 of tube 325. This impulse after amplification in tube 325 is applied to the grid 326 of the trigger tube 310. This tube then becomes conductive to discharge condenser 302, returning the electron ray in tube 268 to its frame start position. Discharging the condenser 302 also decreases the potential at load resistance 316 thus lowering the potential of the control electrode 320 thereby causing the deflection of the electrons from the anode 321.

From the foregoing it will be understood that in the absence of signals, due to fading, or in turning the receiver on when there is no transmitter operating, that the electron ray in the tube 268 will oscillate both horizontally and vertically.

The video and control signals are demodulated at the second detector or rectifying tube 266. These signals are applied to the power amplifier 267 and after suitable amplification they are impressed on the control grid of the picture tube 268. Since the control or synchronizing signals are of a greater amplitude than the picture signals and appear at the end of each line and at the end of each field, they may be used to blank or reduce the intensity of the cathode ray in the viewing tube during the retrace period.

The control signals from detector tube 266 are also applied to the grids of tubes 327 and 328, Fig. 16. The tube 327 for controlling the horizontal deflection period is biased so that the picture signals will not produce anode current, but it does respond to both the line and field synchronizing pulses to thereby apply a voltage impulse through the coupling condenser 329 to the grid 299 of tube 300. After suitable amplification in its anode circuit the signal is applied to the grid 301 of the trigger tube 284 to cause the discharge of condenser 276 thereby returning the electron ray of tube 268 to its starting point.

The tube 328 is biased to eliminate both the picture signals and the horizontal synchronizing impulses, but it will respond to the high amplitude synchronizing pulses to impress a potential impulse through the coupling condenser 330 to the grid 324 of tube 325. This tube will function as previously described to discharge the condenser 302 thereby returning the cathode ray in tube 268 to the starting point of the next field.

From the foregoing it is to be understood that the cathode ray in the receiving tube will be returned to either its horizontal line starting point or the starting point of the next field from any location on the screen upon the reception of a control or synchronizing signal. In other words, the horizontal control signals will return the electron beam to the starting point for the next line, and the vertical control signal will return the electron ray to the starting point of the first line in the next succeeding field.

The amplitude for the horizontal and vertical deflection is adjusted by the movable contacts 282 and 308 to adjust the sweep of the cathode ray across the fluorescent screen 269. The voltage on the anodes 295 and 321 may be adjusted to give considerable voltage drop in the load resistances 297 and 322′ when the cathode ray reaches the leaving side of the screen 269 or when it reaches its limit of travel due to the amplitude adjustment.

The operation of the receiver is as follows: When the receiver is energized, upon closing the power supply circuit the cathode ray will oscillate or travel forward and backward horizontally and vertically by deflecting potentials developed by charging the condensers 276 and 302 and discharging these condensers by the cut off devices or tubes 293 and 319. However, upon the reception of synchronizing signals, interposed between lines and between picture fields, the line deflecting apparatus will function upon the reception of the first horizontal control pulse to return the cathode ray to start the next line in synchronism with the transmitter. Upon the reception of the first vertical control pulse the vertical deflecting apparatus will operate to return the electron ray to start the first line of the next succeeding field. Therefore the receiver will be automatically synchronized with the transmitter upon the reception of the first vertical synchronizing impulse, and the line deflection will be in step with the transmitter upon the reception of the first horizontal control impulse.

Synchronism is accomplished by transmitting a control signal during each retrace period of the cathode ray in the pick up tube and utilizing this control signal at the receiver to return the cathode ray in the viewing tube to its starting point for the next forward movement.

In order to automatically control or regulate the deflection of the electron ray at the receiver and to care for slight irregularities in the transmitted control signals I employ a regulator comprising a glow lamp 331, a photocell 332, and a double purpose tube 333. The glow lamp 331 and photoelectric cell 332 may be mounted in separate lightproof containers arranged in such a manner that the light from the glow lamp will be directed toward the photocell as indicated by the dotted line 334.

The operation of the regulator is as follows: as the voltage at the load resistance 290 is increasing to move the electron ray horizontally forward, this increasing potential is also applied through condenser 335 to the grid 336 of the glow lamp 331. This will gradually increase the current through the glow lamp to cause it to glow more brilliantly. The variable light intensities from the glow lamp 331 are directed toward the photocell 332 as previously explained, and as the brilliancy increases the potential on the grid 337 is increased. The grid 337 is biased so that current will only flow in its plate circuit during the high amplitude of the saw tooth voltage wave or for a small distance of travel of the electron ray at the leaving edge of the screen. The potential change at the anode 338 is applied to the grid 339 causing a decrease of current through its anode, switch 340 and common load resistance 341. The charging resistance 277 and condenser 276 are connected in parallel with the resistance of the second set of elements of tube 333 comprising the anode 342. Therefore an increase in the resistance of the anode 342 circuit will cause a decrease in the charging current through the resistance 277 thereby slightly decreasing the frequency of deflection.

In operation the horizontal line frequency is adjusted slightly slower than the transmitter frequency which will cause the cut off or discharge of condenser 276 a short interval before the electron ray arrives at the leaving edge of the screen or picture, which means that the saw tooth wave did not reach its peak amplitude. Therefore the glow lamp would be slightly dimmed causing a higher current value through the resistance 277. Should the frequency at the receiver become too high the glow lamp would develop a greater intensity of light thus reducing the current flow through resistance 227.

From the above description it will be seen that this regulator will tend to stabilize the horizontal scanning frequency at the receiver. While I have not shown the specific circuits to regulate or stabilize the vertical scanning frequency, I have shown a block diagram 343 to represent a similar regulator circuit arrangement comprising a glow lamp, photocell and double purpose amplifier and it is to be understood that this regulator 343 will operate to automatically control or regulate the vertical sweep frequency in a manner similar to that described above for horizontal regulation over the conductors 344 and 345 and through common resistance 346.

The cut off devices or the "off and on" electron relay tube 293 and 319 may be considered as a safety device so that the electron ray in tube 268 will continue to oscillate should the signals fade, or the transmitting station go off the air. With the reception of strong signals these tubes do not cause the return of the electron ray to its starting point. However, when monitoring on a transmitter using other forms of synchronizing signals the voltage on tubes 293 and 319 may be adjusted to return the electron ray in synchronism with the transmitter without utilizing any transmitted control signals.

To monitor on a television channel without utilizing at the receiver any one of several different synchronizing or control signals that may be transmitted, assuming that the scanning frequencies are reasonably stable, adjust at 288 and 314 the amplitude of the saw tooth waves or the sweep of the electron ray to scan a slightly smaller area than normal and employing the tubes 293 and 319 to develop cut off signals. Then adjust the horizontal and vertical frequencies at 282 and 308 so that the reproduced picture will have a narrow black line or border on the right and bottom edges. This mark is caused by blanking signals between lines and between fields. The black lines at the leaving edges of the screen will indicate when the receiver has been adjusted for the proper scanning frequencies as any deviation in the size of the reproduced picture would show that receiver was operating slow or fast.

For various controls at the receiver I provide a sensitive relay 347 operated through the tube 348. The signal impulse from tube 325 which triggers the tube 310 as previously explained is also supplied through the switch 349 to the grid of tube 348. The voltage impulse on the grid 348 occurring at the end of each field or frame will increase the current momentarily in relay 347 thereby energizing it to close the spring contacts 350 momentarily to either place ground potential on relay 63′ over the conductor 64′ at the end of each picture field for controlling the step by step movement of a film to be more fully described later, or to place ground potential through the switch 351 to the flip-flop relay 352 which operates in a manner similar to that previously described for relay 238. The relay 352 actuated at the end of each vertical period will alternately close the contacts 353 to place ground potential through switch 354 on the conductor 64′ during alternate vertical periods for controlling the movement of a rotating screen or film to be further described later. The contacts 355 may be closed during alternate field periods to place ground potential through switch 356 to the relay 86′ for the purpose of controlling the focus of the lens system at the receiver during alternate field periods to be later described.

Figure 17:
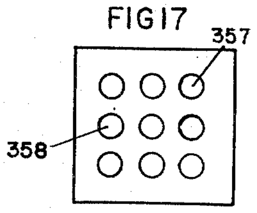
Figure 17 is a diagrammatic view of the arrangement of several photo electric cells for multiplex communication.

With reference to Figure 17, I have shown a number of photocells 357, 358 etc. arranged on the inside of a cathode ray tube similar to the tube 268 and in a manner similar to the glow lamps in Figure 13. Each cell has a luminescent coating so that each of the several spaced sound signals transmitted will cause various degrees of light intensities in their respective photocell to vary the signal current output. Each of these photocells 357, 358 etc. may be connected to an amplifier and speaker similar to the amplifier 274 and speaker 275 to reproduce several separate communications simultaneously.

Figure 18:
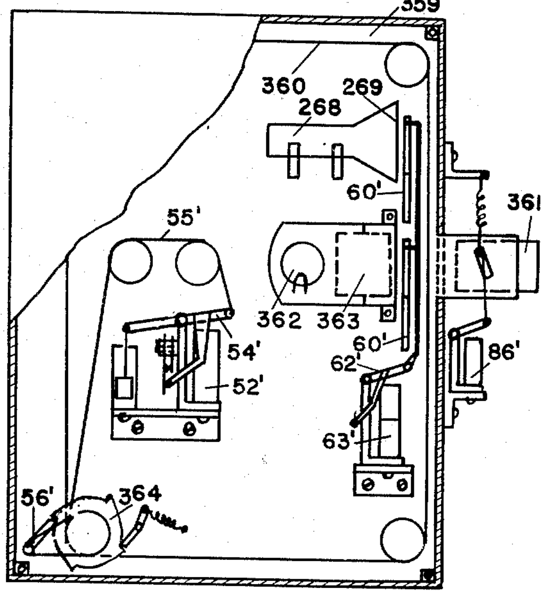
Figure 18 is an improved television picture projecting device having one side cover partially removed showing the arrangement of the various pieces of associated mechanism.

With reference to Figure 18 I have shown an improved picture projecting machine or motion picture machine which comprises means for initiating the movement of a luminescent coated film by the received synchronizing or control signals.

In this picture projecting machine I initiate the step by step movement of the film by the control impulse signals developed at the end of each field. These impulses also return the cathode ray in the picture tube to the starting point for the next picture field or frame; therefore regardless of the vertical scanning frequency the film movement will always be in synchronism with the changing picture fields in the picture tube.

In Figure 18 the numeral 359 represents a lightproof box having one cover partly broken away to show the various pieces of apparatus contained therein for controlling the movement of an endless picture or luminescent coated film. The endless film 360 may be jerked downward past the picture tube 268 and the lens system 361. The picture tube 268 may be mounted inside the box 359. Images on the screen 269 are projected to the film 360 which is subsequently jerked downward in the path of the light rays from the lamp 362. The passage of the light from the lamp through the lens 363, film 360 and lens system 361 projects the images on the film to a large remote screen, in much the same manner as that of a motion picture projector.

The film is rapidly jerked downward or the step by step movement is caused by the relay 52′ and its associated mechanisms securely mounted inside the box 359. The armature 54′ is connected by a cable 55′ to the ratchet arm 56′ so that the relay 52′ upon energizing operates its armature 54′ to communicate motion to the ratchet arm 56′ and the sprocket wheel 364 to jerk the film downward one picture frame.

To shut off the light from the lamp 362 and the light from the cathode ray tube 268 during the movement of the film 360, I provide a double shutter 60′ rotatably mounted on the frame or box 359 and attached by a rod 61′ to the armature 62′ of the relay 63′ which relay is securely mounted on the inside of the box 359.

The operation of the relays 52′ and 63′ is exactly similar to that described for the relay 52 and 63 in the camera box and as described in connection with Figure 4 with the exception that switch 85 would be in open position. Like reference characters have been given to similar mechanisms.

One of the chief purposes of the lightproof box 359 is to provide a dark compartment for aging the transparent picture film having a coating of luminescent material for storing an image for a short period of time. In other words I employ either a transparent film coated with luminescent material or the luminescent material may be held between two pieces of translucent film or fabric so that an image may be stored on the film until it can be moved in the path of a strong light to project the image onto a large screen at a distance.

The relay 86′ controls the lens system 361 to slightly change the focus of an image projected to a remote screen in order to produce the illusion of depth in the reproduced pictures. The relay 86′ may be operated in alternate field periods by the flip-flop relay 352 to slightly move the lens 361 forward and backward similar to that described for the relay 86. The relay 86′ is rendered inoperative by the switch 356 and would only be operated when the focus changing relay 86 at the transmitter was not operating, that is, during such times when televising from a conventional motion picture film.

Figure 19:
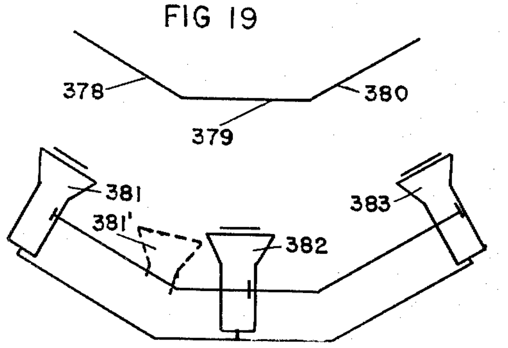
Figures 19 and 20 are diagrammatic views of the arrangement of picture tubes projecting motion pictures to several screens simultaneously.
Figure 20:
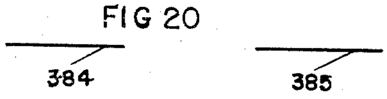

Referring to Figures 19 and 20, I illustrate two arrangements that may be utilized in projecting pictures in theatres to two or more screens. In present day motion picture theatres the pictures are projected to only one large screen with the result that the pictures seen by the patrons close to either wall will be very much distorted. To overcome this distortion I employ three large screens 378, 379 and 380 in Figure 21 and each served by a separate projecting device as described above in connection with Figure 18 and as illustrated by the reference numerals 381, 382 and 383. Since these devices are in multiple the same pictures will be shown simultaneously on the three screens and the patrons near the sides of the house will see the picture as distinctly as those in the middle section.

With further reference to Figure 19 I also employ two projecting devices such as 381 and 382 for projecting the same pictures to a single screen but focused slightly different at the screen; that is, 381′ may be focused slightly in front of and slightly to one side of the image projected by the other device 382 to give the illusion of depth to the pictures.

Figure 20 shows a different arrangement of large screens 384 and 385 in a theatre so that a greater number of patrons may view undistorted pictures. Furthermore many different arrangements of the screens may be employed to serve larger groups of people; for instance, the stage may be set in the center of an amphitheatre with the pictures showing on four or six different screens simultaneously.

In the various circuits shown and described I have simplified the drawings by indicating the source of potential by a positive or negative sign. Also I have omitted the heater filaments for the various tubes, but it will be understood that such filaments would be necessary.

The embodiments of the invention which have been given herein are illustrations of how the various features may be accomplished and the principles involved. It is to be understood that the invention contained herein is capable of embodiment in many other forms and adaptations, without departing from the spirit of the invention and the scope of the appended claims.

Having thus described my invention, I claim:

1. In a television transmitter for transmitting pictures from a movable film, a cathode ray tube having a screen and an electron ray directed toward the screen, a moving picture projector for projecting said pictures upon said screen, said projector provided with a lens and a shutter for shutting off light intermittently from the lens, mechanism for moving said film into position intermittently for projecting picture frames successively upon said screen, means to produce line and frame synchronizing control signals, deflecting means under control of said synchronizing signals to cause the electron ray to scan successive image frames on said screen, and electro-magnetic means responsive to certain of said frame synchronizing control signals for controlling said mechanism to initiate the movement of said film and said shutter at the end of alternate frames.

2. In a television transmitter for transmitting pictures from a movable film, a cathode ray tube having a screen and an electron ray directed toward the screen, a moving picture projector for projecting said pictures upon said screen, said projector provided with a lens and a shutter for shutting off light intermittently from the lens, mechanism for moving said film into position intermittently for projecting picture frames successively upon said screen, means to produce line and frame synchronizing control signals, deflecting means under control of said synchronizing signals to cause the electron ray to scan successive image frames on said screen, electro-magnetic means under control of certain of said frame synchronizing signals to initiate the movement of said film at the end of alternate scanned image frames, and an electro-magnetic device under control of said certain frame control signals to initiate the movement of said shutter at the end of said alternate image frames.

3. In a television transmitter for the transmission of pictures on a movable film, a cathode ray tube having a mosaic screen and an electron ray directed toward the screen, a moving picture projector for projecting said pictures upon said screen, mechanism for moving said film into position intermittently for projecting picture frames successively upon said screen, means for moving the electron ray horizontally and vertically to scan said picture frames, means for developing signal impulses, means for driving the electron ray successively backward horizontally under the control of groups of said impulses, means for driving the electron ray backward both vertically and horizontally at the termination of each picture frame under the control of other ones of said impulses intermediate the groups of impulses, and electro-magnetic means under control of certain of said other impulses for actuating said mechanism to initiate the movement of said film at the termination of alternate picture frames.

4. In a television system, a cathode ray tube provided with a screen and an electron ray directed toward the screen, means for deflecting the electron ray in horizontal and vertical directions to scan said screen to produce images thereon from received picture signals, means for intercepting line and frame control signals, means responsive to said control signals for initiating the horizontal backward deflection of the electron ray, a moving picture film, mechanism for intermittently moving said film into position to develop thereon successive picture image frames from said screen, means responsive to said frame control signals for initiating the vertical backward movement of the electron ray and means including an electron tube responsive only to said frame control signals to initiate movement of said film.

5. In a television transmitter for the transmission of pictures on a movable film, a cathode ray tube having a screen and an electron ray directed toward the screen, a moving picture projector for projecting said pictures upon said screen, mechanism for moving intermittently said film into position for successively projecting the said pictures on the said film to the said screen, means for deflecting the electron ray in bi-dimensional directions to scan said screen, means for producing line and frame control signals to control the scanning actions, and means for selecting alternate frame control signals to initiate the movement of said film.

6. In a system for the transmission of pictures on a movable film, a cathode ray tube having an image plate and an electron ray directed toward the image plate, a picture projector for projecting said pictures upon said plate, mechanism for moving said film into position for projecting picture frames successively upon said plate, means for deflecting the electron ray in bi-dimensional directions to scan the said plate to thereby produce picture signals, means for producing line and frame control signals to control the scanning actions, means under control of certain of said frame control signals to control said mechanism thereby controlling the movement of said film, means for transmitting said picture signals and said control signals, a receiver comprising a plurality of cathode ray receiving tubes each provided with an integral screen and an electron ray directed toward the screen, means for deflecting the electron ray in each receiving tube in bi-dimensional directions to scan its associated screen to produce thereon picture images from said picture signals, a moving picture film associated with each screen, a device associated with each moving picture film for moving it into position to develop thereon successive picture image frames from its associated screen, means responsive to said control signals for controlling the receiver scanning actions, and means responsive to certain of said frame control signals to control said devices thereby controlling the movement of all the said moving picture films.

7. In a television transmitter for the transmission of pictures on a moving film, a cathode ray tube having a mosaic screen and an electron ray directed toward the screen, a moving picture projector for projecting said pictures upon said screen, mechanism to move said film into position intermittently for projecting picture frames successively upon said screen, means to produce horizontal and vertical synchronizing control signals, means under control of said control signals to move said electron ray forward and backward both horizontally and vertically to scan said screen, and means responsive to said vertical signals for initiating the movement of said film.

8. In a televison transmitter for the transmission of pictures on a movable film, a cathode ray tube having a mosaic screen and an electron ray directed toward the screen, a moving picture projector for projecting said pictures upon said screen, mechanism for moving said film into position intermittently for projecting picture frames successively upon said screen, means for driving said mechanism, means for deflecting the electron ray in bi-dimensional directions to scan said screen, means for generating periodically recurring signal impulses to control said means for driving said mechanism, and means for utilizing said signal impulses to initiate the backward deflecton of the electron ray in two directions, and means for adjusting the deflecting means to alter the movement of the said film thereby changing the number of picture frames scanned in a given time.

JOHN H. HOMRIGHOUS.

REFERENCES CITED

The following references are of record in the file of this patent:

UNITED STATES PATENTS

| Number | Name | Date |
|---|---|---|
| 2,040,813 | Ogloblinsky | May 12, 1936 |
| 2,137,039 | Vance | Nov. 15, 1938 |
| 2,171,537 | Bingley | Sept. 5, 1939 |
| 2,195,676 | McCarty | Apr. 2, 1940 |
| 2,207,716 | Bumstead | July 16, 1940 |
| 2,221,644 | Lucian | Nov. 12, 1940 |
| 2,233,778 | Foster | Mar. 4, 1941 |
| 2,241,586 | Dorsman | May 13, 1941 |
| 2,261,848 | Goldmark | Nov. 4, 1941 |
| 2,262,584 | Herriott | Nov. 11, 1941 |
| 2,275,898 | Goldsmith | Mar. 10, 1942 |
| 2,280,572 | Farnsworth | Apr. 21, 1942 |
| 2,301,199 | Bruce | Nov. 10, 1942 |
| 2,302,311 | Goldsmith | Nov. 17, 1942 |
| 2,303,960 | Seeley | Dec. 1, 1942 |
| 2,320,699 | Homrighous | June 1, 1943 |
| 2,404,839 | Hammond | July 30, 1946 |

FOREIGN PATENTS

| Number | Country | Date |
|---|---|---|
| 315,362 | Great Britain | July 24, 1929 |

OTHER REFERENCES

"Television," by Zworykin & Morton, pp. 170 and 171.

"Television Standards and Practice," N. T. S. C., McGraw-Hill Book Co., Inc., 1943, page 238.